United States Patent [19]

Cristescu et al.

[11] Patent Number: 4,904,210
[45] Date of Patent: Feb. 27, 1990

[54] TELECOMMUNICATIONS CONNECTOR

[75] Inventors: Alex G. Cristescu, Montreal; Eugene F. Marc, St. Lambert, both of Canada

[73] Assignee: Northern Telecom Limited, Montreal, Canada

[21] Appl. No.: 220,191

[22] Filed: Jul. 18, 1988

[51] Int. Cl.[4] .................................... H01R 23/02
[52] U.S. Cl. ................................ 439/676; 439/344; 439/357
[58] Field of Search .............. 439/357, 712, 718, 696, 439/701, 344, 676, 738, 752, 732, 695, 688; 29/837, 838, 842, 844

[56] References Cited

U.S. PATENT DOCUMENTS

| | | | |
|---|---|---|---|
| 3,905,673 | 9/1925 | Evans et al. | 439/79 |
| 4,050,769 | 9/1977 | Ammon | 439/701 |
| 4,444,451 | 4/1984 | Myers | 439/344 |
| 4,699,595 | 10/1987 | Nakazawa et al. | 439/676 |
| 4,703,991 | 11/1987 | Philippson | 439/676 |
| 4,738,638 | 4/1988 | Bogese II | 439/676 |

Primary Examiner—David Pirlot
Attorney, Agent, or Firm—R. J. Austin

[57] ABSTRACT

Telecommunications connector having a modular jack with a plug chamber open at one end of the body, and conductive lines with terminals projecting into the chamber and plate terminals projecting from the other end of the body. A dielectric retainer holds the plate terminals in position. In a practical arrangement, the retainer has walls and a base with the modular jack mounted between the walls and engaging the base. The conductive lines extend between the modular jack and a wall of the retainer with the plate terminals extending through slots in the base of the retainer.

8 Claims, 2 Drawing Sheets

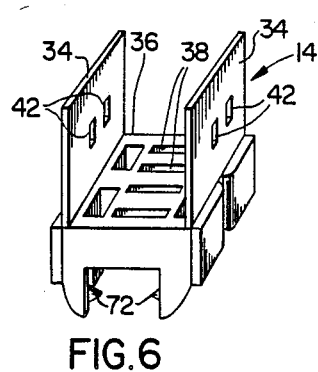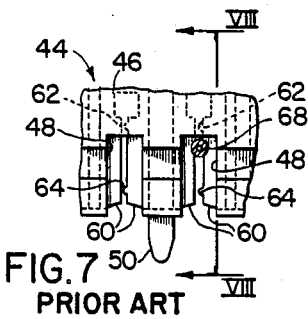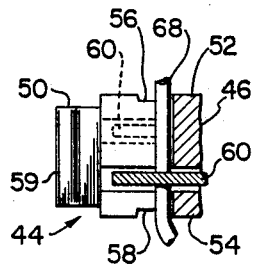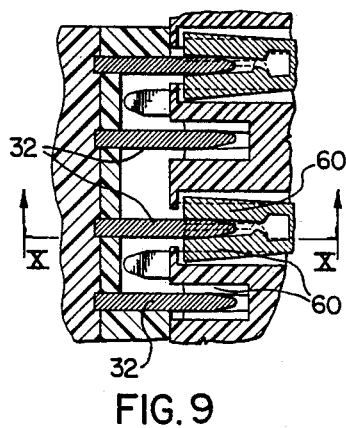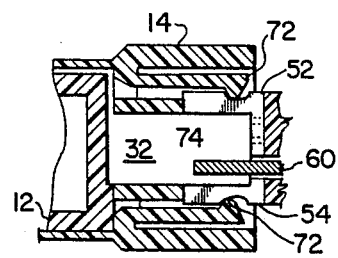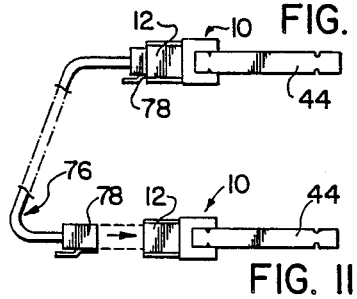

TELECOMMUNICATIONS CONNECTOR

This invention relates to telecommunications connectors.

Sometimes it would be convenient for one type of telecommunications cable to be connected with another to simplify line circuitry particularly within customer's internal networks. However, the designs of connectors which it would otherwise be convenient to connect together, are not always compatible with one another and therefore a direct connection between the two is impossible. In such situations, it is clear that an intermediate connector (commonly referred to as an "adaptor") may be used between the two connectors which are needed to be joined together. At other times, connector design may be changed so as to suit certain requirements and in other instances, bridging links may be provided between one connector and another which are in fixed positions and cannot be joined in any other way.

Problems concerning simplification of line circuitry occur with the use of distribution frames for the distribution of electrical wiring to access points in terminals within a customer's premises from an incoming telecommunications cable. The distribution frame may be of the construction of frame referred to as a "module" in U.S. Pat. No. 4,278,315, granted July 14, 1981 in the name of B. T. Osborne. Distribution frames have mounted therein a plurality of terminal assemblies, normally of a construction referred to as "cross-connect connectors" in that each assembly comprises a dielectric terminal carrier with two spaced rows of insulation displacement terminals held by the carrier. The terminals of one row are interconnected electrically and in desired fashion with those of the other row through the dielectric carrier. The construction of cross-connect connectors may be as referred to as "connector block" in U.S Pat. No. 4,295,703, granted Oct. 20, 1981 in the name of B. T. Osborne.

According to normal practice, at a distribution frame an incoming cable is brought into an input location of the frame and its conductor wires are distributed as required to the various positions for mounting the cross-connect connectors. Each connector is then connected to its associated wires of the incoming cable so that these wires are connected to a row of terminals of each connector which is disposed at a rear of the connector as mounted in the frame. Another cable or cables are then connected to the terminals of the forwardly facing rows in the connectors and form part of the customer's internal circuitry. These cables are distributed as necessary throughout a building for connection to telecommunications equipment, e.g. telephones and data processing equipment.

Various problems associated with the use of the above distribution frames and cross-connect connectors have been overcome as highlighted in various patent applications referred to below. For instance in U.S. patent application Ser. No. 018,230, filed Feb. 24, 1987 in the name of L. A. Beaulieu, a connector is described in which a first part of it is a cross-connect connector and a second part of it has a modular jack structure for directly receiving plugs for modular jacks. With this system the telecommunications equipment may be connected directly to the outlet from the distribution frame as required. U.S. patent application Ser. No. 018,234 filed on Feb. 24, 1987 in the name of L. A. Beaulieu, et al, is concerned with a distribution frame in which further connectors are wired to the rearwardly facing rows of terminals of the cross-connect connectors, these further connectors being for direct connection to conductors of an incoming cable where these conductors are themselves terminated at a connector. In U.S. Pat. application Ser. Nos. 536,027 and 536,028, filed Apr. 30, 1987 in the name of L. A. Beaulieu et al, connectors are described for joining together the forwardly facing rows of cross-connect connectors in one distribution frame. The connectors described in these two applications are bridging connectors or patch cord connectors. Further, in U.S. Pat. No. 4,367,908 granted Jan. 11, 1983 in the name of J. J. Johnston, there is described an electrical connector coupling for electrically connecting together two plug type connectors of the same construction.

The present invention seeks to provide a telecommunications connector including a modular jack and plate terminals electrically connected to terminals in the modular jack, and in which the connector may be made suitable for use with a cross-connect connector.

Accordingly, the invention provides a telecommunications connector comprising a modular jack having a dielectric body with two ends, sides extending between the ends, the body formed with a chamber and an aperture to the chamber at one end of the body for accepting a plug into the chamber, and a plurality of conductive lines having terminals projecting into the chamber and a plurality of plate terminals projecting from the other end of the body; and dielectric means for retaining the blade terminals in a desired location and position of orientation relative to the body of the jack.

With the above telecommunications connector of suitable design, the plate terminals may be inserted into terminals of one row of terminals of a cross-connect connector for enabling a jack of an item of telecommunications equipment to be connected into the cross-connect connector while avoiding the use of additional circuitry.

The connector of the invention may be constructed in an economic fashion by various means. In one economically produced structure, the conductive lines extend along the side of and on the outside of the body and around an edge of the body to the plate terminals. Such an arrangement avoids the necessity of laying-in the conductive lines inside the jack body. Further, the dielectric retaining means may comprise a planar dielectric element formed with slots so that the plate terminals extend through the slots to hold them in their locations and positions of orientation.

The dielectric retaining member is preferably one having walls extending from a base, the base providing the planar element. The walls are spaced apart to mount the jack body between them with the body engaging the base. In this situation, the walls of the jack body face and lie alongside the walls of the retaining member. In a commercially and economically feasible structure, the retaining member has only two walls which are spaced apart across the base so as to provide a U-shaped structure.

With the above structure in which the retaining member has walls, in a case where the conductive lines extend along one wall of and on the outside of the body, then one of the walls of the retaining member serves to shroud the conductive lines as they extend to the plate terminals. As a result, although the conductive lines lie on the outside surface of the jack body, there is no disadvantage in this structure as the lines are insulated from outside the connector.

The invention also includes a method of making a telecommunications connector comprising: providing a modular jack by having a jack body with two ends and sides extending between the ends and with a chamber formed within the body and an aperture to the chamber at one end of the body for accepting a plug into the chamber, providing conductive lines each having a terminal at one end projecting into the chamber and at the other end having a plate terminal disposed at and projecting from the other end of the body; and locating a dielectric retaining means at the other end of the body to hold the blade terminals in a desired location and position of orientation relative to the body of the jack.

Embodiments of the invention will now be described, by way of example, with reference to the accompanying drawings, in which:

FIG. 6 is an isometric view of another part of the connector;

FIG. 7 is a plan view of a cross-connect connector to which the connector of the embodiment is to be connected;

FIG. 8 is a cross-sectional view along line VIII—VIII in FIG. 7 of the cross-connect connector;

FIG. 9 is a view similar to FIG. 7 showing the connector of the embodiment assembled to the cross-connect connector;

FIG. 10 is a cross-sectional view taken along line X—X in FIG. 9; and

FIG. 11 is a diagrammatic side view on smaller scale, showing a further use for the connector of the embodiment.

Figure 3:
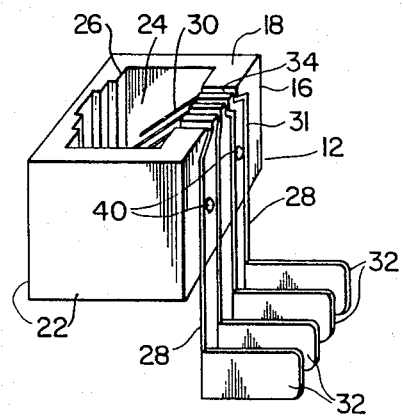
FIG. 3 is an isometric view of a jack body of the connector at one stage in its manufacture.
Figure 4:
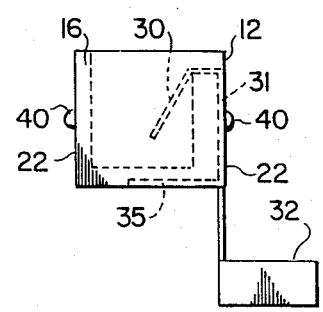
FIG. 4 is an end view of the jack body in FIG. 3.
Figure 5:
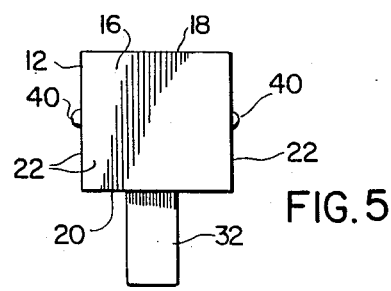
FIG. 5 is a view similar to FIG. 3 at a different stage in manufacture of the jack.

In the embodiment, a telecommunications connector 10 (FIGS. 1 and 2) comprises a modular jack 12 and a retaining member 14 which provides a dielectric retaining means for a purpose which will be described. As shown in FIGS. 3, 4 and 5, the modular jack 12 comprises a six-sided body 16 having two ends 18 and 20 and four walls 22 extending between the ends. The jack body is formed with a chamber 24 for accepting a conventional plug for a modular jack, the chamber having an aperture 26 opening at the end 18. The jack is also provided with four conductive lines 28. Each conductive line is in the form of a cantilever spring terminal 30 which projects into the chamber 24 in conventional fashion for a modular jack, for contact with a terminal of the plug to be inserted into the chamber. At the end of the conductive lines remote from the terminals 30 are provided plate terminals 32.

The jack 12 is manufactured in a particularly economical fashion. Each of the conductive lines 28 is preformed with its terminal 32 soldered or otherwise secured to the conductive line with the plate terminal 32 projecting in the opposite direction from the cantilever terminal 30 as shown in FIG. 3. Conductive lines 28 are then disposed in grooves 31 along one side 22 of the jack body (FIGS. 3 and 4) and extend through grooves 33 formed in the end 18 of the body so that the terminals 30 extend into the chamber 24. In this position, the other ends of the conductive lines 28 extend downwardly beyond the body and past the wall 22 on which they are mounted with the plate terminals 32 spaced from and projecting away from the body as shown in FIGS. 3 and 4. Subsequently, the lower ends of the conductive lines 28 are bent around an edge of the body formed between the supporting wall 22 and the end 20 so that the lines are located in grooves 35 in end 20 and the plate terminals extend outwardly normal to the end 20 as shown in FIG. 5.

It is then necessary to hold the plate terminals 32 in a desired location relative to the wall 20 so as to be able to engage with terminals of another connector. It is also required to hold the plate terminals 32 in a required position of orientation relative to the body of the jack, i.e. normal to the end wall 20 as shown in FIG. 5. For this purpose, the dielectric retaining means in the form of the retaining member 14 is used. It would of course be possible to hold the plate terminals in their desired positions by merely applying a planar dielectric plate to the end wall 20 of the jack body and securing it with adhesive to the end wall. Such a plate would be formed with apertures or slots for accommodating the plate terminals 32 so as to hold them correctly in position. However, in this embodiment, the retaining means in the form of the retaining member 14 also serves to shroud the conductive lines 28 so as to protect them in use of the connector.

Bearing the above points in mind, as shown by FIG. 6, the retaining member 14 is U-shaped and comprises two walls 34 extending upwardly from a base 36. Base 36 is formed with four parallel spaced apart slots 38 to enable the plate terminals 32 to pass through them during assembly of the retaining member with the jack 12, i.e. with the jack contained between the two walls 34 and supported upon the base 36.

The jack, in its final form shown in FIG. 5, is inserted downwardly between the walls 34 with the conductive lines 38 shrouded by the walls 34 and base 36.

Means is provided for securing the jack body to the walls of the retaining member. This retaining means comprises a plurality of projections 40 (see FIGS. 3 and 4) which extend outwardly from each of the walls 22 for location within corresponding projection receiving regions defined by the walls 34. These regions are in the form of apertures 42 in the walls 34 (FIG. 6). Walls 34 are resiliently flexible so as to allow for insertion of the jack body between them with the projections 40 engaging and forcing the walls apart until the projections enter into the apertures 42. Upon the projections entering the apertures, the walls resiliently return to their original positions and resist removal of the jack from between them. It is of course possible to remove the jack by forcing the walls 34 apart as by inserting a tool between the walls 34 and 22. If it is desired to secure the parts together permanently, then the jack body may be secured within the retaining member by some form of adhesive. In this present embodiment in which both the jack body and the retaining member are formed from a suitable dielectric material, i.e. a polycarbonate, then an ultraviolet curable adhesive may be used between the parts.

Figure 1:
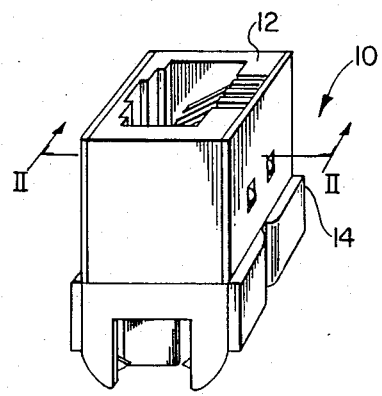
FIG. 1 is an isometric view of a telecommunications connector.
Figure 2:
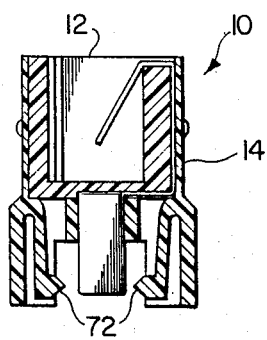
FIG. 2 is a cross-sectional view of the connector taken along line II—II in FIG. 1.

In the assembled condition, as shown in FIGS. 1 and 2, the plate terminals 32 project through the slots 38 to be held securely in their positions and directions of orientation with the conductive lines 28 completely shrouded by the retaining member 14. Thus the connector is manufactured in a simple fashion by the molding of two interfitting body parts, i.e. the jack body and the retaining member. The body parts, when assembled, completely shroud the conductive lines which are assembled to the jack body merely by placing them around the outer surface of the body. Thus, the manufacturing procedure avoids the forming of passageways through the dielectric material for acceptance of the conductive lines or alternatively, avoids the more complicated process of inserting the preshaped lines and plate terminals 32 in a required position within a mold so as to be molded into a single dielectric body during the molding procedure.

The connector 10 is intended to be secured to a terminal assembly such as the BIX (Registered Trade Mark of Northern Telecom Limited) terminal assembly 44 shown in FIGS. 7 and 8 and commonly used in distribution frames of telephone exchanges. Each terminal assembly 44, commonly referred to as a cross-connect connector is of the construction described in U.S. Pat. No. 4,295,703 and comprises an elongate dielectric terminal carrier 46 having a rectilinear array of vertically extending slots 48 provided in two longitudinally extending edges of the terminal carrier. In FIGS. 7 and 8, one edge only of the carrier 46 is shown. The slots 48 are in pairs and a finger 50 projects forwardly between the individual slots of each pair. Upper and lower faces 52 and 54 (FIG. 10) of the carrier 46 include upper and lower longitudinally extending recesses 56 and 58 respectively, disposed rearwardly from the forward edge 59 of the carrier. Each of the recesses 56 and 58 is interrupted along its length by the slots 48.

The terminal carrier 46 carries an array of insulation displacement terminals each comprising a pair of contact arms 60 which extend from within the carrier 46 and project forward into a respective slot 48. One of the arms 60 includes a preload projection 62 which engages the other arm to spring the arms slightly apart, and a strain relief projection 64 which is located forward of the preload projection and which projects towards the other arm. Each arm also includes a cutting edge 66 at its forward end adjacent the cutting edge of the opposite arm. The arms 60 may be resiliently deflected in opposite lateral directions within the terminal carrier so as normally to accommodate an insulated conductor wire 68 between them.

However, it is intended that a connector or connectors 10 will be connected to the terminals of terminal assembly 44 so as to enable items of telecommunications equipment to be connected directly with the terminal assembly by insertion of plugs into the jacks 12, the plugs being connected directly by cable with the items of terminal equipment.

To enable the connector 10 to be connected into terminals of the terminal assembly 44, the connector 10 is provided with two pairs of latches 72 which, as shown in FIG. 2, are molded integrally with the retaining member 14. The latches of each pair are molded one between each pair of plate terminals 32. When the connector 10 is assembled to the terminal assembly 44, as shown in FIGS. 9 and 10, the plate terminals 32 extend between contact arms 60 of each pair so as to make electrical connection with them. At the same time, the latches 72 are opened by movement across the upper and lower faces 52 and 54 of carrier 46 until facing heads 74 of the latches enter into the recesses 56 and 58 in the faces 52 and 54. As shown in FIG. 10, the latches then resiliently move towards each other so that heads 74 occupy the recesses 56 and 58 to hold the connector 10 in position. With the connector disposed as shown in FIGS. 9 and 10, a plug connected to an item of terminal equipment may then be inserted into the jack 12 to be connected with the terminal assembly.

In an alternative use of connectors 10 of the embodiment, as shown in FIG. 11, two connectors 10 are assembled into two terminal assemblies 44 provided either upon the same distribution frame or on different distribution frames. A patch cord 76 extends between them, the cord 76 having at its ends two plugs 78 received within the modular jacks 12.

What is claimed is:

1. A telecommunications connector comprising:
   a modular jack having a dielectric body with two ends, sides extending between the ends, the body formed with a chamber and an aperture to the chamber at one end of the body for accepting a plug into the chamber, and a plurality of conductive lines, said plurality of conductive lines having cantilever terminals projecting into the chamber and blade terminals projecting away from the other end of the body in a direction opposite to the facing direction of the aperture, the cantilever terminals being connected, one to each blade terminal, by intermediate line portions extending from the cantilever terminals along the outside of the body, around an edge of the body and along the outside of the other end of the body;
   and dielectric retaining means comprising a retaining member with a base and walls extending in spaced apart positions from the base with the jack body mounted between them and with the other end of the jack body engaging the base and said intermediate line portions enshrouded between the body and a wall and base of the retaining member, the blade terminals passing through and extending from elongate section holes formed in the base and which hold the blade terminals in desired locations and orientations relative to the body of the jack.

2. A connector according to claim 1 having securing means for securing sides of the jack body to walls of the retaining member with the jack body mounted in the retaining member.

3. A connector according to claim 2 wherein the securing means comprises a plurality of projections extending outwardly from sides of the jack body, the projections receivable within projection receiving regions defined by walls of the retaining member, movement of the projections into the projection receiving regions being achievable by resilient flexing movement of the walls of the retaining member.

4. A connector according to claim 1 wherein the conductive lines comprise conductive strips extending between said one side of the body and said one wall of the retaining member.

5. A connector according to claim 4 wherein the conductive strips are disposed in grooves formed in the one side of and on the outside of the body.

6. A telecommunication connector comprising:
   a modular jack having a dielectric body with two ends, sides extending between the ends, the body formed with a chamber and an aperture to the chamber at one end of the body for accepting the plug into the chamber, and a plurality of conductive lines, said plurality of conductive lines having cantilever terminals projecting into the chamber and blade terminals projecting away from the other end of the body in a direction opposite to the facing direction of the aperture, the cantilever terminals being connected one to each blade terminal by intermediate line portions extending from the cantilever terminals along the outside of the body, around an edge of the body and along the outside of the other end of the body;

and dielectric retaining means comprising a retaining member with a base and walls extending in spaced apart positions from the base, the base formed with elongate section holes and said retaining member having been mounted upon the body by movement of the body between the walls, towards and into contact with the base progressively to enshroud said intermediate line portions between the body and the retaining member and to cause the blade terminals to pass progressively through and then extend from the holes to hold the blade terminals in desired locations and positions or orientation relative to the body of the jack.

7. A method of making a telecommunications connector comprising providing a modular jack having a jack body with two ends and sides extending between the ends and with a chamber formed within the body and an aperture to the chamber at the one end of the body for accepting a plug into the chamber; providing preformed conductive lines each having a cantilever terminal at one end and at the other end having a blade terminal with an intermediate line portion extending between the cantilever and blade terminals, assembling the conductive lines onto the preformed jack body with the intermediate line portions extending along the outside of the body and with the cantilever terminals projecting into the chamber and the blade terminals at the other end spaced away from the body; subsequently bending the conductive lines around an edge of the body to locate the blade terminals at said other end of the body and projecting from said other end of the body in a direction facing in a direction opposite to the facing direction of the aperture; providing a dielectric retaining means comprising a dielectric element formed with a base having slots and walls extending from the base, the walls of the retaining means spaced apart; and mounting the jack body between the walls of the retaining member, passing the blade terminals through the slots provided in the base during mounting of the body between the walls so that the walls progressively enshroud the intermediate line portions between the body and the retaining means until the jack body engages the base of the retaining means, the blade terminals passing through and projecting from the base to be retained in desired locations and orientations relative to the body of the jack.

8. A method according to claim 7 wherein a plurality of locking projections extend outwardly from sides of the jack body, the method comprising moving the jack body between the walls of the retaining means during mounting of the body with said walls of the retaining means being resiliently flexed outwards as the projections move along the walls towards the base, the projections entering into projection receiving regions of the walls upon the body engaging the base to allow the walls resiliently to return inwardly to normal positions and retain the jack body in the retaining means.

* * * * *